United States Patent [19]

Gearing et al.

[11] Patent Number: 5,537,807
[45] Date of Patent: Jul. 23, 1996

[54] YARD-CARE MACHINE

[75] Inventors: Thomas W. Gearing, Wauwatosa; Andrew W. Haver, West Bend, both of Wis.

[73] Assignee: The Patriot Company, Milwaukee, Wis.

[21] Appl. No.: 278,923

[22] Filed: Jul. 22, 1994

[51] Int. Cl.$^6$ .......................... A01D 34/68; A01D 69/08; A01D 69/10; A01D 34/66

[52] U.S. Cl. ........................ 56/11.3; 56/13.1; 56/13.4; 56/13.8; 56/16.9; 56/320.2; 56/255; 241/101.2; 241/101.71

[58] Field of Search ..................... 56/16.9, 12.9, 56/13.1, 13.4, 13.8, 17.5, 320.2, 255, 295, 11.3, 11.8; 241/28, 101.2, 101.7, 107.71

[56] References Cited

U.S. PATENT DOCUMENTS

| | | | |
|---|---|---|---|
| 2,247,665 | 7/1941 | Ottersland | 144/176 |
| 2,547,328 | 4/1951 | Koch et al. | 56/12.9 |
| 2,809,488 | 10/1957 | Sewell | 56/13.8 |
| 3,240,247 | 3/1966 | Lautzenheiser | 146/107 |
| 3,414,094 | 12/1968 | Hauser | 56/11.8 X |
| 3,712,353 | 1/1973 | Ferry | 241/27 |
| 3,817,462 | 5/1974 | Hamlin | 241/101.7 |
| 3,905,181 | 9/1975 | Messner | 56/13.4 X |
| 4,048,788 | 9/1977 | Kamlukin et al. | 56/11.8 X |
| 4,055,935 | 11/1977 | Malion et al. | 56/11.8 X |
| 4,057,952 | 11/1977 | Brokaw | 56/503 X |
| 4,122,652 | 10/1978 | Holtermann | 56/11.8 X |
| 4,263,771 | 4/1981 | Iaboni et al. | 56/16.9 X |
| 4,306,405 | 12/1981 | Fleigle | 56/11.8 X |
| 4,411,125 | 10/1983 | Strickland | 56/320.2 X |
| 4,554,104 | 10/1985 | Carlsson | 241/57 |
| 4,796,416 | 1/1989 | Bendig et al. | 56/16.9 |
| 4,824,034 | 4/1989 | Baker | 241/101.2 |
| 4,834,302 | 5/1989 | Baker | 241/92 |
| 4,944,142 | 7/1990 | Sueshige et al. | 56/320.1 |
| 5,085,376 | 2/1992 | Litchenburg | 241/56 |
| 5,231,827 | 8/1993 | Connolly et al. | 56/13.1 |
| 5,305,587 | 4/1994 | Johnson | 56/16.9 |
| 5,365,725 | 11/1994 | McCance | 56/17.5 X |

FOREIGN PATENT DOCUMENTS 2312938  12/1976  France ................................... 56/16.9

OTHER PUBLICATIONS

Troy-Bilt© Chipper-Vac Product Brochure (4 pages).

*Primary Examiner*—Stephen J. Novosad
*Attorney, Agent, or Firm*—Jansson & Shupe, Ltd.

[57] ABSTRACT

The new yard-care machine includes features of a mower, a mulching mower and a branch chipper. Such machine has a cutting blade in an enlarged lower blade chamber and a fan and a chipper plate in an enlarged upper fan chamber. A restriction separates the chambers and a leaf and grass-comminuting mulching blade is interposed in the restriction between the blade and the plate. The machine shroud has an exhaust port equipped with an optional diffuser for spreading finely-divided mulch on a lawn. The shroud also has an opening through which branches can be introduced to the chipper plate. The resulting branch chips are exhausted into a collection bag. Manual and self-propelled ("walk behind" or riding) versions and various embodiments are disclosed.

26 Claims, 7 Drawing Sheets

YARD-CARE MACHINE

FIELD OF THE INVENTION

This invention relates generally to harvesters and, more particularly, to cutting and comminution of yard products such as grass, leaves, branches and the like.

BACKGROUND OF THE INVENTION

Lawn mowers have been in use for decades and earlier mowers, the reel-type, involved a multi-bladed reel rotating about a horizontal axis. The blades, curved along their length, moved across a stationary sharpened bar to cut blades of grass. Later, the rotary mower was introduced with its vertical drive shaft, horizontal high-speed cutting blade and jet-like exhaust port from which streamed the grass clippings.

But when using either type of mower, the cut top portions of blades of grass were often simply left on the lawn to decompose. In the alternative, such portions were raked from the lawn and discarded or collected in a catch basket (using a reel mower) or a collection bag using a rotary mower. Either choice could be detrimental.

If the "cover" of cut grass was too thick, the underlying grass may well be killed. And in any event, "yellowing" of such underlying grass was very common as the cover of cut grass prevented moisture from escaping and prevented sunlight from reaching the grass. On the other hand, if the cut grass portions were removed, the lawn was deprived of nourishment that otherwise would have been obtained from such portions.

A motivation for development of the mulching mower was the recognition of the fact that grass nutrients were being discarded. The mulching mower is a type of rotary mower but differs therefrom chiefly in the fact that the mulching mower has two cutting blades, rather than one, and no exhaust port. The idea is that the grass portions initially cut by the rotating blades are "recirculated" within the area swept by the blades and cut again, perhaps several times, into more finely-divided pieces of grass.

But the mulching mower is not entirely free of problems. As a general observation, such mowers work well for their intended purpose only if a lawn is cut frequently, perhaps much more often than once per week when ample rain falls. But many mower users mow their lawn only once per week; time often does not permit more frequent mowing.

If a mulching mower is used only when grass is long, such mower tends to "bunch" the cut portions of grass into fist-sized lumps which are deposited on the grass. Such lumps can have the deleterious, grass-killing effect described above.

And the matter of yard care has another aspect which is not addressed by any known type of conventional mower, mulching or otherwise. Home owners often need to dispose of branches trimmed from trees. Many refuse collection companies will not remove such branches and many municipalities prohibit lawn waste from being deposited into landfills.

To meet these emerging needs, a machine known as a chipper-shredder has been introduced and examples of such machines are depicted in U.S. Pat. Nos. 5,156,345 (Baker); 5,102,056 (Ober); 4,824,034 (Baker) and others. Such machines are configured to mulch leaves and chip branches and twigs. As to the latter, small wood chips are advantageously used as a mulching covering around tree, bushes and the like. But such machines have neither a grass mowing nor a grass mulching capability. Thus, for complete yard care, the homeowner is required to purchase (and store and maintain) at least two machines, namely, a mower and a chipper-shredder.

An improved yard-care machine which addresses and overcomes some of the disadvantages of prior art machines would be an important advance in the art.

OBJECT OF THE INVENTION

It is an object of the invention to provide an improved yard-care machine overcoming some of the problems and disadvantages of prior art machines.

Another object of the invention is to provide an improved yard-care machine which provides an improved leaf and grass-mulching capability.

Another object of the invention is to provide an improved yard-care machine capable of mowing, mulching and chipping branches.

Still another object of the invention is to provide an improved yard-care machine capable of "diffusing" mulched grass and leaves in a nearly-machine-wide swath across a lawn.

Yet another object of the invention is to provide an improved yard-care machine capable of collecting mulched grass and/or leaves in a receptacle carried on the machine.

Another object of the invention is to provide an improved multi-purpose yard-care machine which can be configured for manual or self-propulsion, the latter in either "walk behind" or riding styles. How these and other objects are accomplished will become apparent from the following descriptions and from the drawing.

SUMMARY OF THE INVENTION

The invention involves a yard-care machine of the type having a rotating cutting blade for removing the top portions of blades of grass. In the improvement, the machine has at least one rotating mulching blade spaced from the blade and comminuting the top portions into finely divided grass particles, i.e., such top portions are converted to lawn-enriching mulch.

The cutting blade rotates in a first or blade chamber having a first dimension and the mulching blade rotates in a "necked-down" second chamber or restriction. Such restriction has a second dimension substantially less than the first dimension. In a highly preferred embodiment, there are two mulching blades at an angle to one another, preferably about 90°. Such bars have a length which is generally the same bar to bar and which is substantially less than that of the cutting blade.

In another embodiment, the machine has first and second sets of mulching blades. The sets are spaced from one another and define a slot between them. The machine includes an optional stationary shearing bar positioned in the slot. When the bar is used (and given that the clearance between such bar and either mulching blade set is quite small), grass and leaves are very finely mulched as they are "worked" by and between the mulching blades and the bar.

The cutting blade, the mulching blade(s) and the combined fan and chipping plate are surrounded by a protective shroud. In cross-section, such shroud resembles an exaggerated hourglass with enlarged top and bottom chambers and the restriction at the shroud "waist," i.e., between the chambers.

A portion of the machine shroud is spaced above the mulching blade and has an exhaust port and a diffuser positioned at the exhaust port. Finely divided grass particles exhausted from the port are diffused across the surface of a lawn in a swath which is about equal to the width of the machine. Thus, the machine provides good grass mulch rather than lumps or windrows of grass and promotes grass growth because of the naturally-occurring nutrients available from decomposing grass.

The machine also has a set of wheels and an engine with a shaft for driving the cutting blade and the mulching blade. Optionally, the shaft is equipped with a power transfer device such as a V-belt pulley for transferring power from the shaft to the wheels so that the machine is self-propelled.

In other aspect of the invention, a chipping plate is interposed between the upper portion of the shroud and the mulching blade(s). There is an opening through the shroud for introducing branches into contact with the chipping plate so that such branches may be comminuted into small branch chips useful for tree and bush mulching and the like.

A fan is adjacent to the chipping plate and rotates in a fan chamber. The upper portion of the shroud includes a shroud opening and an exhaust port, the latter for discharging the chips (or mulched grass) into a receptacle such as an attached bag. Chips or finely-divided grass particles, as the case may be, are urged along through the port by the air stream created in large part by the fan.

In the new machine, it is contemplated that with a single prime mover engine, such machine may be used for grass mowing, grass and leaf mulching or, in the alternative, for branch and twig chipping. To that end, there is a clutch and brake assembly interconnected with the shaft and the cutting blade. The cutting blade may thereby be disconnected from the engine and quickly stopped while yet permitting the engine to drive the fan and the chipping plate.

In an exemplary configuration, a spring-biased actuating lever is manually held in a position for mowing. When it is desired to use the machine for branch chipping, the lever is released, the cutting blade is "de-clutched" from the shaft and braked rapidly to a stop.

And that is not all. In another embodiment, the shroud defines a single chamber and has plural cutting blades rotating in such chamber. The cutting blades, the fan and the chipping plate are confined in the same chamber.

Either machine embodiment may include a vacuum device for drawing lawn refuse—grass, leaves, small twigs and the like—into the machine for comminution. One embodiment of such device includes a vacuum hose attached to the shroud. Another embodiment includes a removable fitted tray substantially sealing against the bottom perimeter of the machine shroud and having a vacuum hose attached thereto.

The machine also includes a feature which helps promote high velocity air flow and helps prevent pieces of grass and leaves from sticking to the interior surface of the shroud. Such shroud has a low-friction interior surface, either by virtue of such shroud being made of plastic or because the interior surface is coated with a low-friction material.

Further details of the invention are set forth in the following detailed description and in the drawing.

DETAILED DESCRIPTION OF PREFERRED EMBODIMENTS

Figure 1:
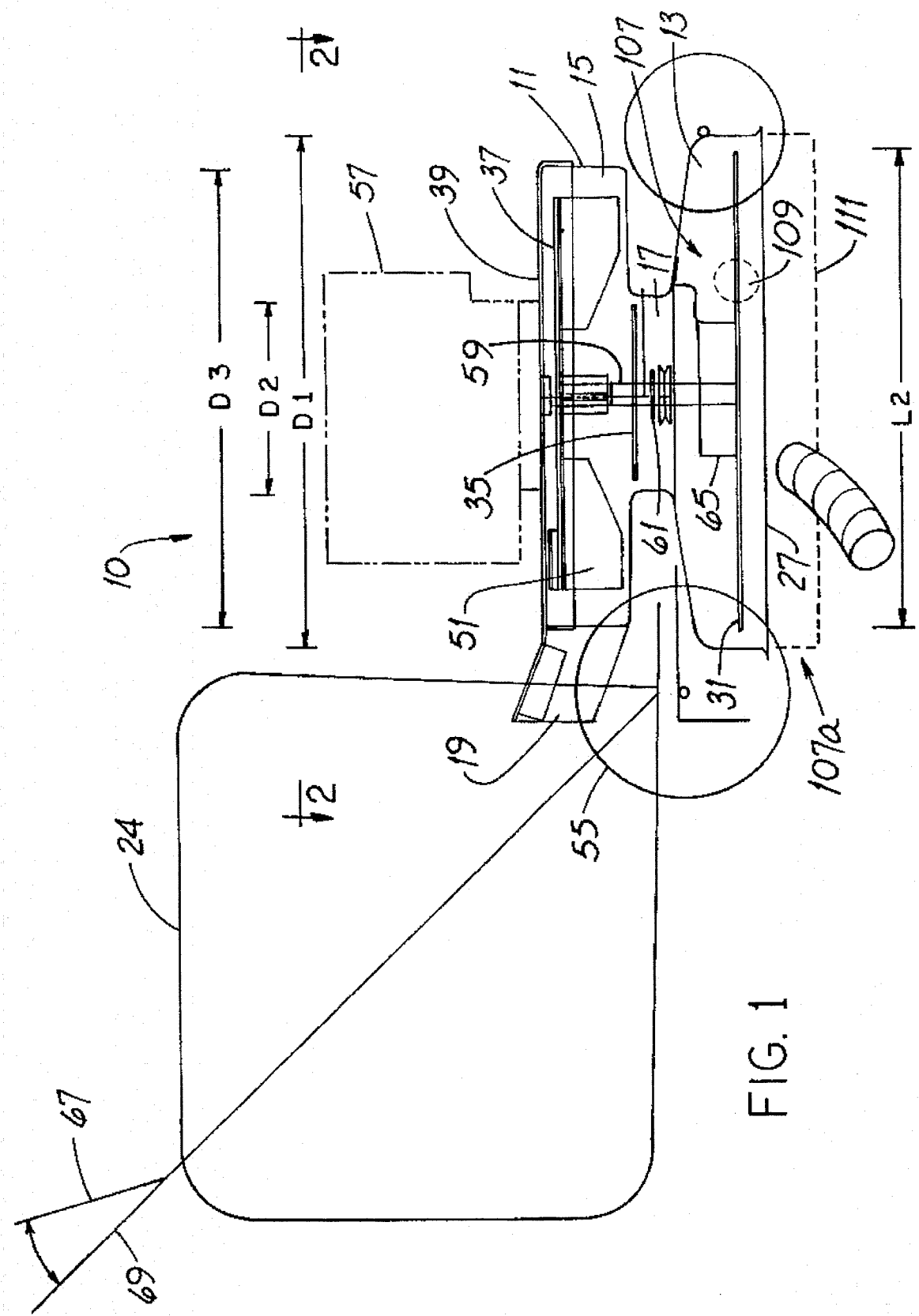
FIG. 1 is a phantom side elevation view of the new yard-care machine.
Figure 2:
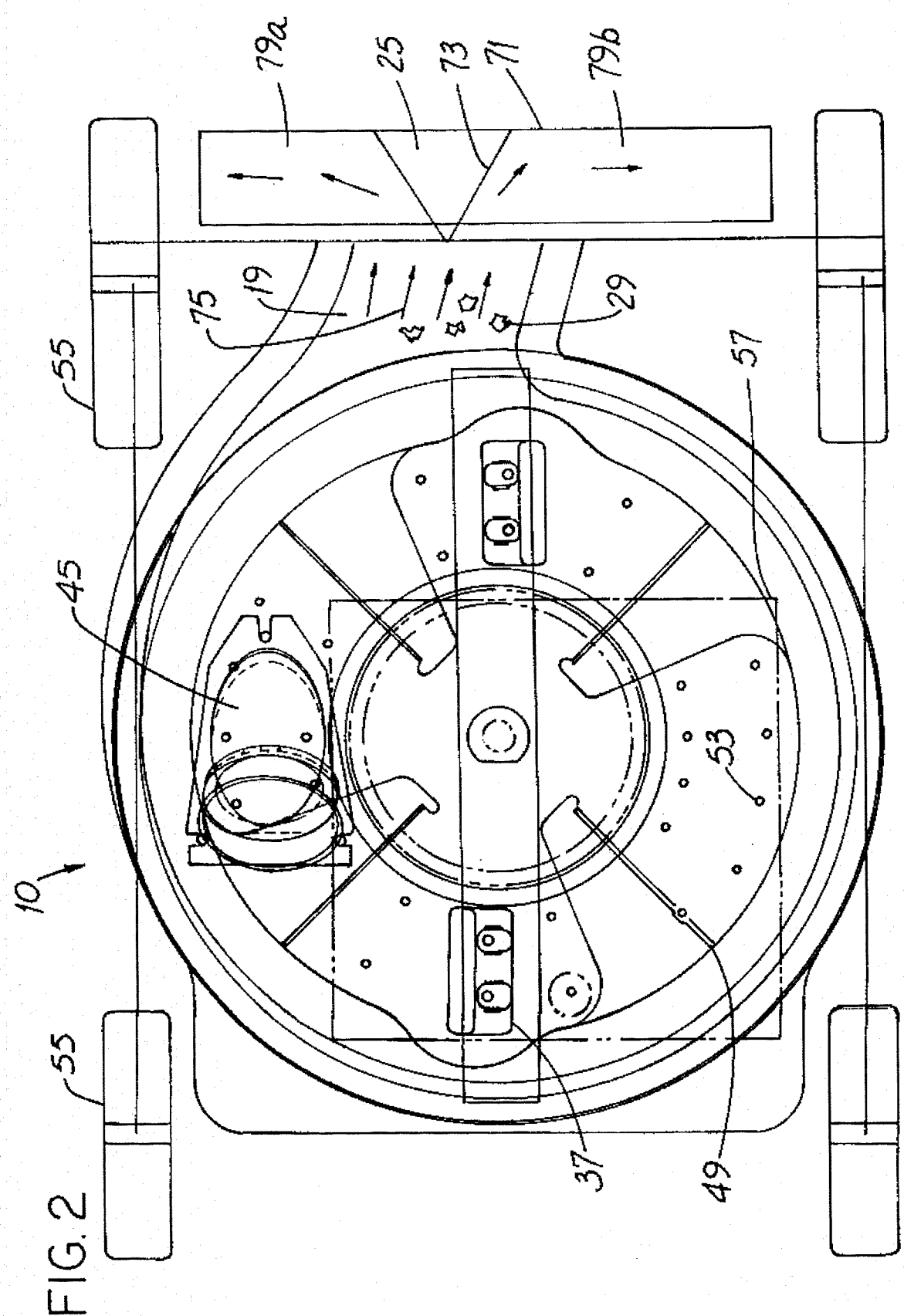
FIG. 2 is a phantom top plan view of the machine of FIG. 1 taken generally along the viewing plane 2—2 of FIG. 1.

Referring first to FIGS. 1, 2, 3, 5 and 8, a first embodiment of the new yard-care machine 10 will now be described. Such machine 10 has a shroud 11 that defines two chambers, namely, the first, lower blade chamber 13 and the upper fan chamber 15. The shroud 11 also defines an intermediate chamber 17 which constitutes a "waist" or restriction between the lower and upper chambers 13 and 15, respectively.

All of the chambers 13, 15, 17 are generally circular as viewed from the top down, i.e., as with viewing plane 2—2. In the view of FIG. 1, the shape of 10 the shroud 11 resembles that of a squat hourglass. From FIG. 1, it is apparent that the dimension "D2" of the restriction is substantially less than either the dimension "D1" of the first chamber or the dimension "D3" of the fan chamber.

While the lower and intermediate chambers 13, 17 are entirely enclosed around their perimeters, the fan chamber 15 includes an outward-scrolling exhaust port 19 through which the cut, mulched top portions of blades of grass 21 (or wood chips 23, as the case may be) are ejected into a bag 24, for example. During mowing operations and if the user wishes to distribute such top portions 21 on the lawn, a diffuser 25 is provided for that purpose. In use, air flows under the lower perimeter 27 of the shroud 11, circulates in the chamber 13, flows upward through the restriction 17, circulates in the chamber 15 and is exhausted from the port 19, carrying mulched leaf and grass particles 29 or wood chips 23 with it.

Figure 3:
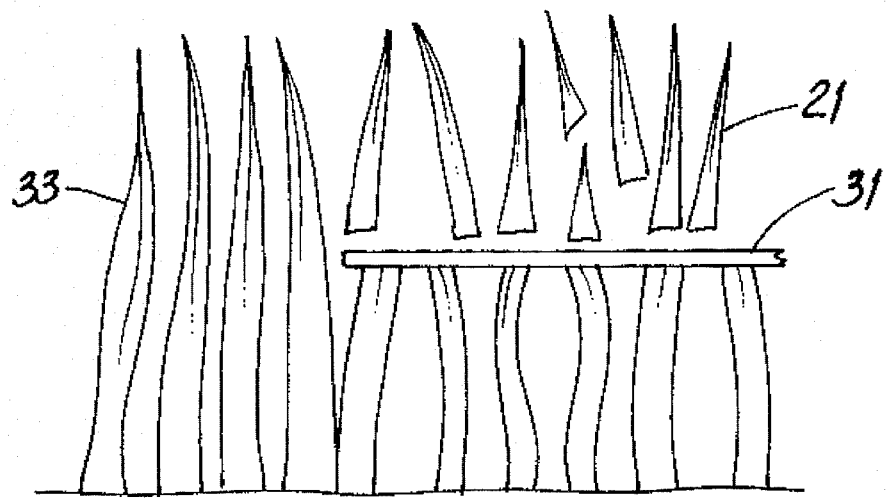
FIG. 3 is a representative side elevation view showing the machine cutting blade while cutting grass blade top portions. Cutting blade parts are broken away.
Figure 4:
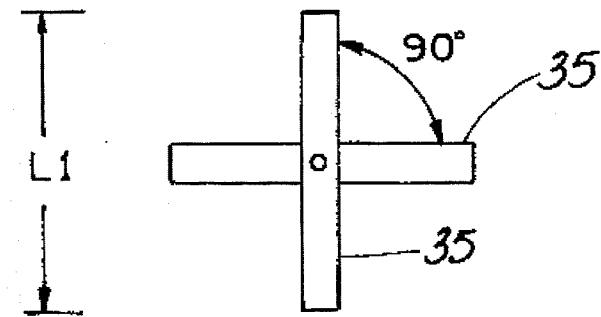
FIG. 4 is a top plan view of the mulching blades.
Figure 5:
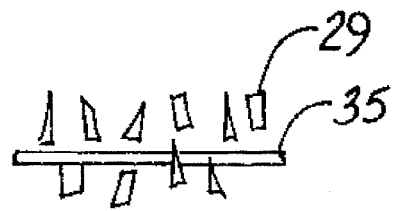
FIG. 5 is a representative side elevation view showing the mulching blades while mulching the blade top portions into finely-divided particles of grass. Mulching blade parts are broken away.
Figure 6:
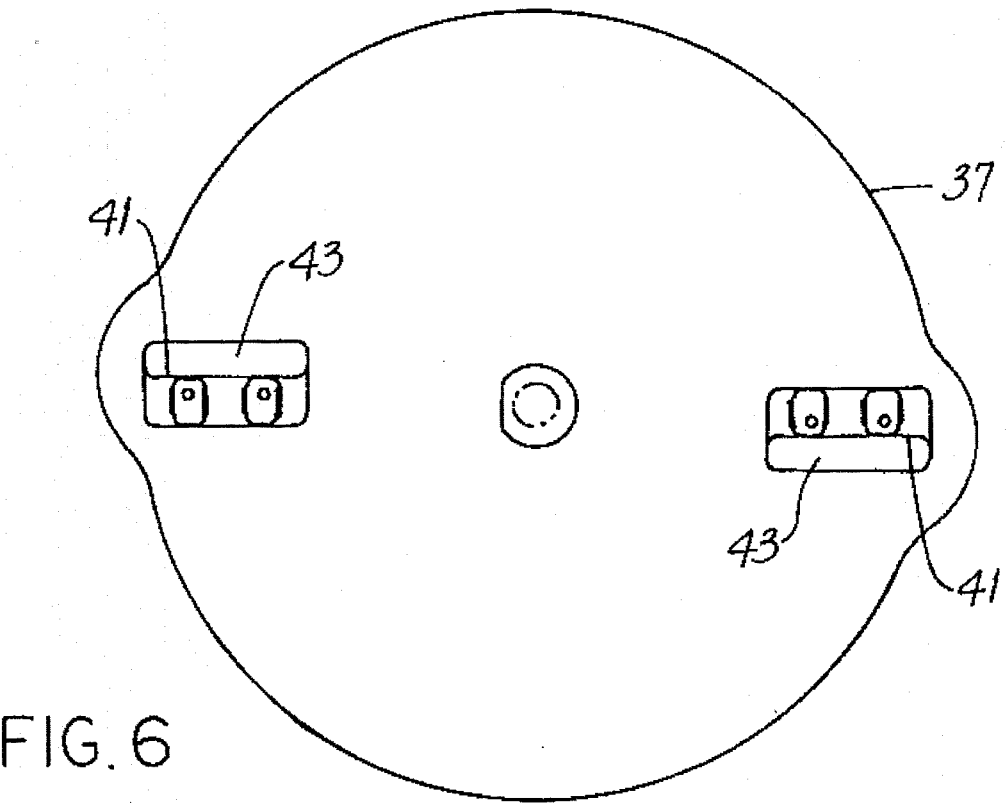
FIG. 6 is a top plan view of the machine chipping plate taken generally from the perspective of viewing plane 2—2.
Figure 7:
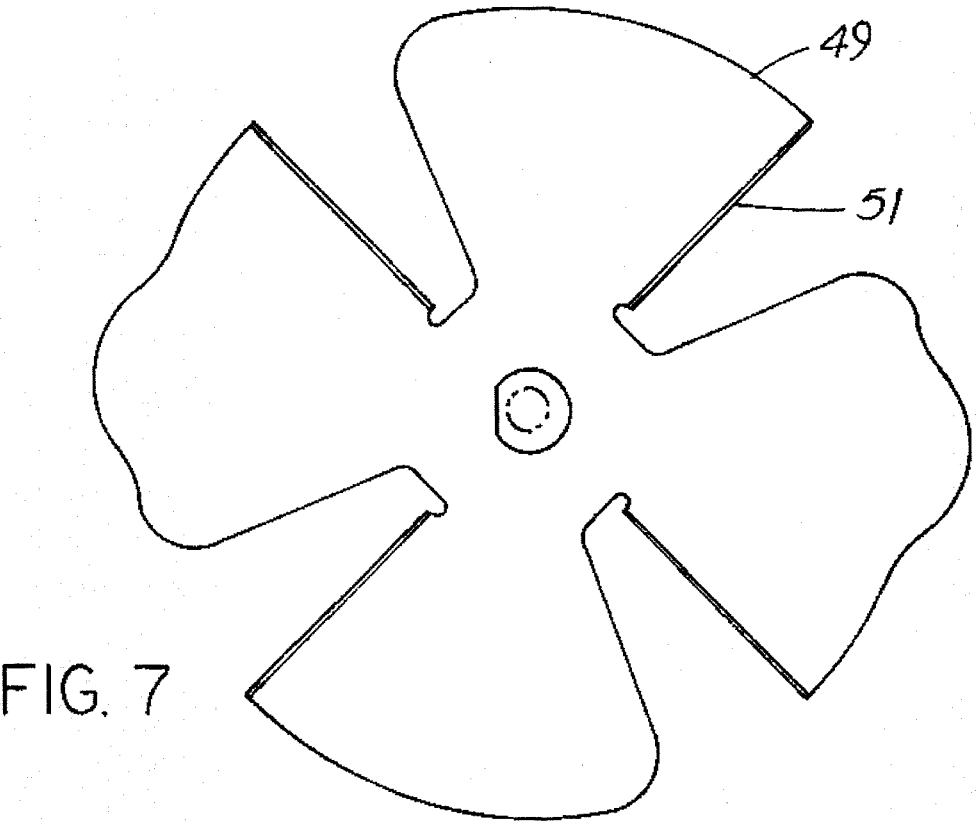
FIG. 7 is a top plan view of the machine fan taken generally from the perspective of viewing plane 2—2.
Figure 8:
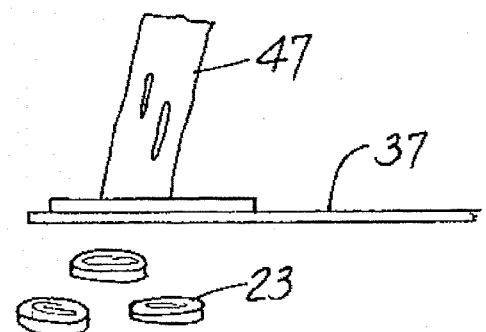
FIG. 8 is a representative side elevation view showing the chipping plate while slicing branch chips from a tree branch. Parts of the chipping plate are broken away.

The cutting blade 31 rotates in the first chamber 13 and removes the top portions 21 of blades of grass 33 as shown in FIG. 3. Referring also to FIG. 4, the machine 10 has at least one rotating mulching blade 35 spaced above the blade 31, rotating in the intermediate chamber or restriction 17 and comminuting the top portions 21 into finely divided grass particles 29. Such top portions 21 are thereby converted into lawn-enriching mulch. In one preferred embodiment, there are two mulching blades at an angle to one another, preferably about 90°. Such blades have a length "L1" which is generally the same blade to blade and which is substantially less than the length "L2" of the cutting blade 31.

Referring now to FIGS. 1, 2, 6, 7 and 8, the machine 10 also has a disc-like chipping plate 37 interposed between the upper portion 39 of the shroud 11 and the mulching blade(s) 35. Such plate 37 has a pair of chipping knives 41 attached thereto and a corresponding pair of slot-like apertures 43. There is an opening 45 through the shroud 11 for introducing a branch 47 into contact with the chipping plate 37 so that such branch 47 may be comminuted into small branch chips 23 useful for tree and bush mulching and the like. The branch chips 23 travel through the apertures 43 as they are "sliced" from the end of a branch 47.

A fan 49 is adjacent to the chipping plate 37 and has downwardly-depending fan blades 51 circulating air. The blades 51 and the upper chamber 15 form what may be referred to as a centrifugal fan. In a highly preferred embodiment, the fan 49 and the chipping plate 37 are in surface contact with one another, are held together by rivets 53 and rotate simultaneously.

Figure 9:
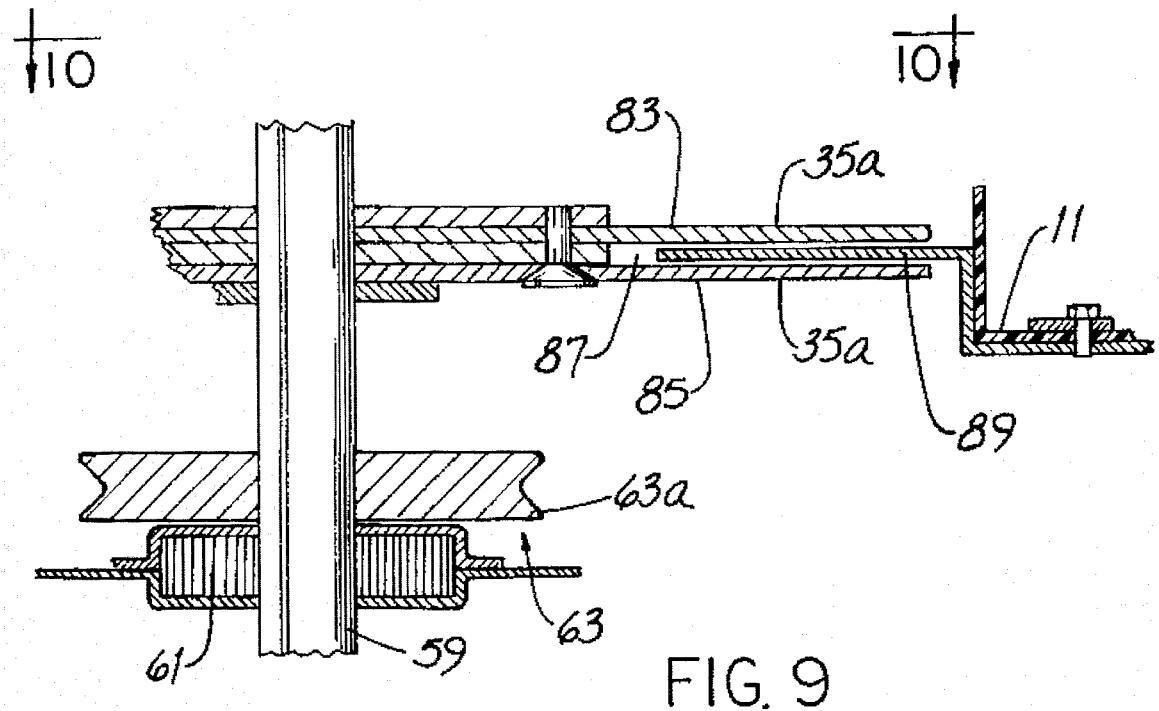
FIG. 9 is a side elevation view of another embodiment of mulching blades. Parts are broken away.

Referring again to FIG. 1 and also to FIG. 9, the machine 10 also has wheels 55 and an engine 57 with a shaft 59 supported by a bearing 61 for driving the cutting blade 31, the mulching blade 35 and the fan 49 and chipping plate 37. Optionally, the shaft 59 is equipped with a power transfer device 63 such as a V-belt pulley 63a for transferring power from the shaft 59 to the wheels 55 so that the machine 10 is self-propelled, either in a "walk-behind" mode or in a "rider" configuration.

It is contemplated that with a single prime mover engine 57, the machine 10 may be used for grass mowing and mulching or, in the alternative, for branch and twig chipping. To that end, the machine 10 has a clutch and brake assembly 65 interconnected with the shaft 59 and the cutting blade 31. The cutting blade 31 may thereby be disconnected from the engine 57 and quickly stopped while yet permitting the engine 57 to drive the fan 49 and the chipping plate 37.

In an exemplary configuration, a spring-biased actuating lever 67 is manually held in a position against the handle 69 for mowing. When it is desired to use the machine 10 for branch chipping, the lever 67 is released to the position shown in solid line, the cutting blade 31 is "de-clutched" from the shaft 59 and braked rapidly to a stop.

The diffuser 25, used for mulching, includes a laterally-oriented tube 71 and a deflector 73 at the mouth of the port 19. The air stream 75 bearing finely-divided particles 29 is deflected laterally along two paths 79a, 79b generally 180° apart. Finely divided grass and/or leaf particles 29 exhausted from the port 19 are thereby diffused across the surface of a lawn 83 in a swath which is at least about equal to the width of the machine 10. Thus, the machine 10 provides a highly acceptable mulch rather than, in the case of grass, lumps or windrows. Such mulch promotes grass growth because of the naturally-occurring nutrients available from decomposing grass and leaves.

Figure 10:
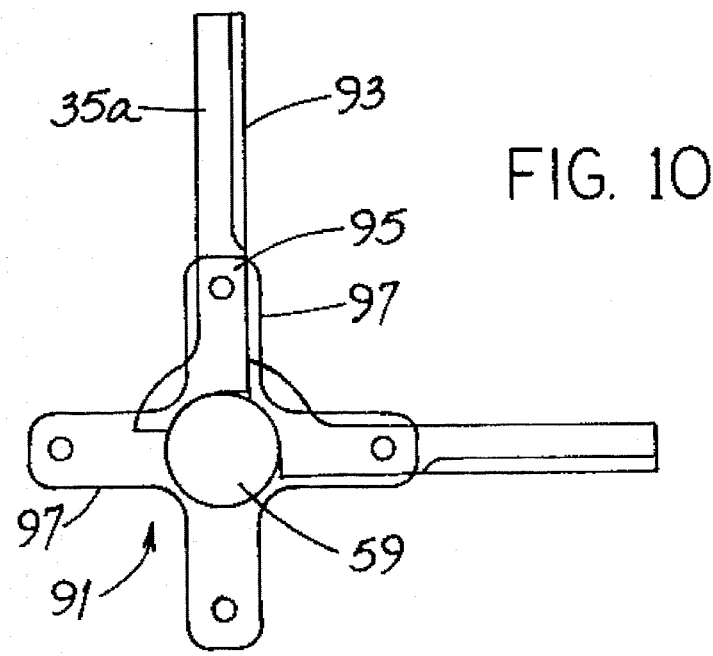
FIG. 10 is a top plan view of a mulching blade mounting plate having two mulching blades mounted thereon. The view is taken generally along the viewing plane 10—10 of FIG. 9.
Figure 11:
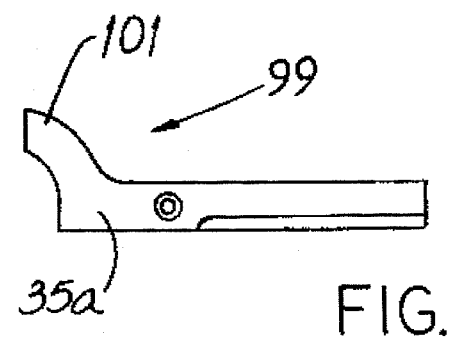
FIG. 11 is a top plan view of a single mulching blade like those shown in FIG. 10.

Referring next to FIGS. 9, 10 and 11, in a highly preferred embodiment, the machine 10 has first and second sets of mulching blades 83 and 85, respectively. The blades 35a of a particular set 83 or 85 are spaced from those of the other set 85 or 83 to define a slot 87 therebetween. In the illustrated configuration, many of the top portions 21 of grass struck by the mulching blades 35a will be struck substantially simultaneously by a blade 35a of each set 83, 85 for even better mulching.

And the machine 10 may include an optional shearing bar 89 attached to the shroud 11 or other convenient attachment point. Such bar 89 projects radially inward, has a thickness less than the dimension of the slot 87 and is positioned so that the blades 35a of one set 83 pass just above the bar 89 while the blades 35a of the other set 85 pass just below it.

As shown in FIG. 10, the blades 35a of each set are attached to a clover-leaf-shaped or "lobed" mounting plate 91 affixed to the shaft 59. Each blade 35a has an outer sharpened edge 93 and an intermediate portion 95 bolted or otherwise attached to a lobe 97 of the plate 91. The inward end 99 of each blade 35a has a hook portion 101 extending about 90° around the shaft 59 and when all four blades 35a are in place on a plate 91, their inward ends 99 interlock with one another. From the foregoing, it will be appreciated that each set 83, 85 may have more or fewer than four blades 35a and that the inward ends 99 can nevertheless be configured to interlock.

Figure 12:
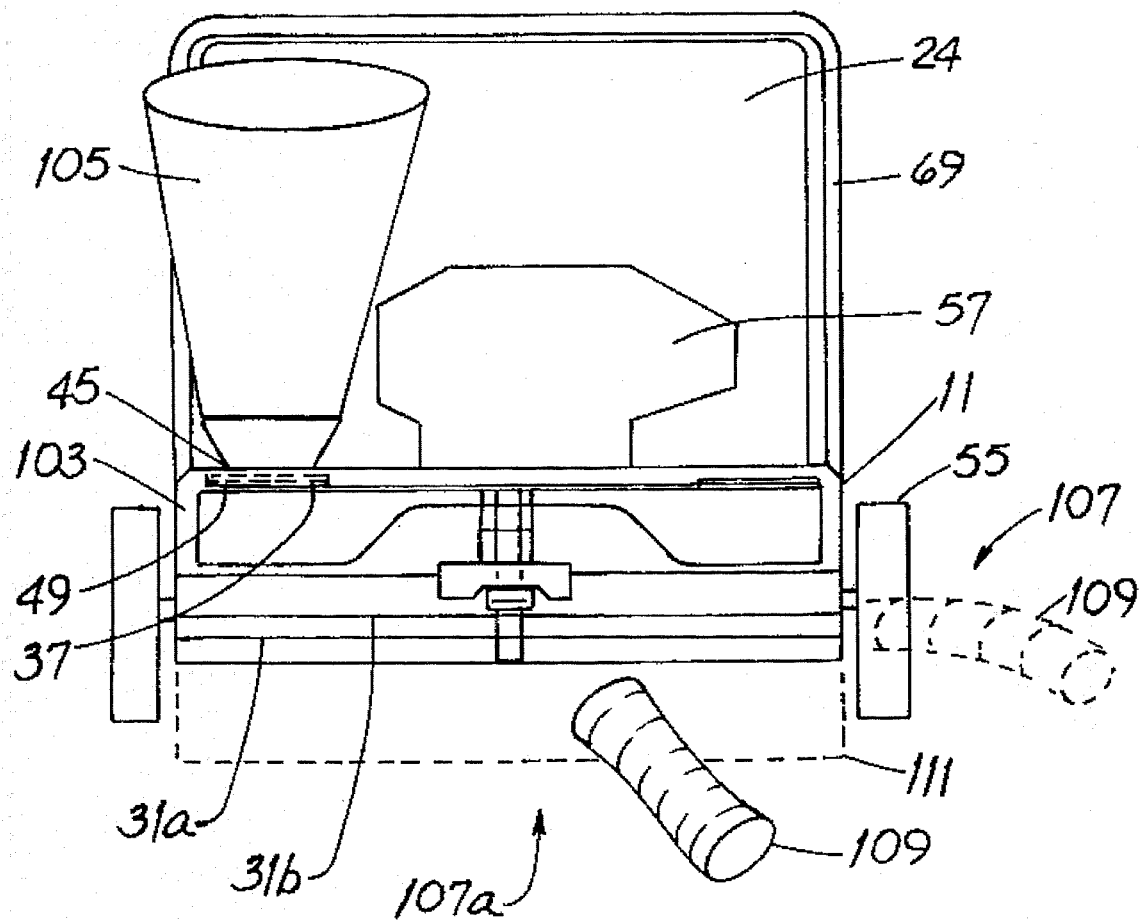
FIG. 12 is a phantom representative front elevation view of a second embodiment of the new machine.

Referring now to FIG. 12, another embodiment of the machine 10 will be described. The machine 10 of FIG. 12 includes an engine 57, a shroud 11 and a single chamber 103 defined by such shroud 11. Rotating in the chamber 103 are plural cutting blades 31a, 31b, a fan 49 and a chipping plate 37.

There is an opening 45 in the shroud 11 for introducing branches 47 into contact with the plate 37 as described above. A chipping cone 105 is removably attached to the shroud 11 and when the machine 10 is used for chipping branches 47, such cone 105 guides a branch 47 inward through the opening 45. The cone 105 is omitted from the embodiment depicted in FIGS. 1 and 2.

Referring particularly to FIGS. 1 and 12, either machine embodiment may include a vacuum device 107, 107a for drawing lawn refuse—grass, leaves, small twigs and the like—into the machine 10 for comminutation. One embodiment 107 of such device includes a vacuum hose 109 attached to the shroud 11. Another embodiment includes a removable fitted tray 111 substantially sealing against the bottom perimeter 27 of the machine shroud 11 and having a vacuum hose 109 attached thereto.

Figure 14:
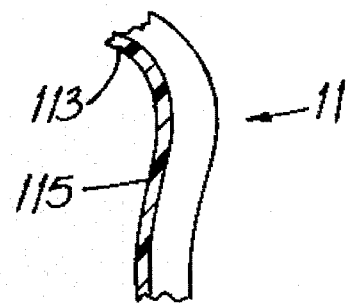
FIG. 14 is a cross-section view of another embodiment of a machine shroud having a low-friction interior surface. Parts are broken away.
Figure 13:
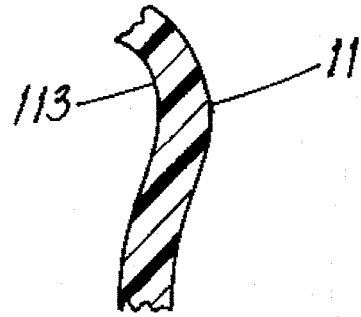
FIG. 13 is a cross-section view of a machine shroud made of a low-friction material. Parts are broken away.

Referring next to FIGS. 13 and 14, the machine 10 also includes a feature which helps promote high velocity air flow and helps prevent pieces of grass and leaves from sticking to the interior surface 113 of the shroud 11. Such shroud 11 has a low-friction interior surface, either by virtue of such shroud 11 being made of plastic as shown in FIG. 13 or because the interior surface 113 is embodied as a coating 115 of plastic-like or other low-friction material as shown in FIG. 14.

From the foregoing, several facts regarding the new machine 10 are apparent. One is that such machine 10 is highly effective as a lawn mower. Another is that such machine 10 mulches grass top portions 21 into particles 29 in a way not possible with known machines. Yet another fact is that such machine 10 is highly suitable for vacuuming leaves from a lawn, shredding such leaves into a highly-nutritive mulch and diffusing such leaf mulch back onto the lawn, all in one "pass." And, of course, grass, leaf mulch and/or wood chips can be collected in the bag 24.

While the principles of the invention have been disclosed in connection with specific embodiments, it is to be understood clearly that such embodiments are exemplary and not limiting.

What is claimed is:

1. In a yard-care machine having a shroud and a cutting blade rotating in the shroud about an axis of rotation for removing the top portions of blades of grass, the improvement wherein:

the shroud includes an upper chamber and a lower chamber;

the lower chamber has a first dimension measured generally normally to the axis and the cutting blade rotates in the lower chamber;

the machine has a restricting area between the chambers and generally in registry with the axis of rotation;

the restricting area has a second dimension measured generally normally to the axis and the second dimension is less than the first dimension;

at least one rotating mulching blade is at the restricting area and comminutes the top portions into finely divided grass particles, whereby the top portions are converted to lawn-enriching mulch.

2. The machine of claim 1 including two mulching blades and wherein:

the mulching blades are at an angle to one another; and the mulching blades rotate about the axis of rotation.

3. The machine of claim 1 including first and second sets of rotating mulching blades and wherein:

the sets are substantially in vertical registry with and spaced from one another;

the sets define a slot therebetween; and the machine includes a single shearing bar aligned with the slot and secured with respect to the shroud, whereby grass and leaves are finely mulched.

4. The machine of claim 1 including:

a shroud spaced above the mulching blade;

an exhaust port in the shroud; and a diffuser positioned at the exhaust port, whereby finely divided grass particles exhausted from the port are diffused across the surface of a lawn.

5. The machine of claim 4 including:

a set of wheels;

an engine having a shaft for driving the cutting blade and the mulching blade; and a power transfer device for transferring power from the shaft to the wheels, whereby the machine is self-propelled.

6. The machine of claim 1 further including:

a shroud spaced above the mulching blade;

a chipping plate interposed between the shroud and the mulching blade; and an opening through the shroud for introducing branches into contact with the chipping plate, whereby such branches may be comminuted into chips.

7. The machine of claim 6 including a fan adjacent to the chipping plate and wherein:

the shroud includes an exhaust port for discharging the chips into a receptacle.

8. In a yard-care machine having a cutting blade for removing the top portions of blades of grass, the improvement comprising:

a machine shroud having a shroud opening and an exhaust port;

a fan spaced above the cutting blade for urging air through the port; and a chipping plate for comminuting branches introduced through the opening, thereby forming branch chips, whereby branches may be reduced to chips and exhausted through the port.

9. The machine of claim 8 including:

an engine having a shaft for driving the cutting blade, the fan and the chipping plate; and a clutch interconnected with the shaft and the cutting blade, whereby the cutting blade may be disabled while yet permitting the engine to drive the fan and the chipping plate.

10. The machine of claim 9 wherein:

the cutting blade rotates in a blade chamber;

the fan rotates in a fan chamber; and the chambers are separated by a restriction.

11. The machine of claim 10 including at least one mulching blade rotating in the restriction whereby the machine comminutes the top portions of blades of grass into finely-divided particles.

12. The machine of claim 8 wherein the shroud defines a single chamber and the machine includes:

plural cutting blades rotating in the chamber, and wherein the cutting blades, the fan and the chipping plate are confined in the same chamber.

13. The machine of claim 8 further including a vacuum device for drawing lawn refuse into the machine.

14. The machine of claim 13 wherein the vacuum device includes a vacuum hose attached to the shroud.

15. The machine of claim 13 including a bottom perimeter and wherein the vacuum device includes a tray substantially sealing against the bottom perimeter, the tray having a vacuum hose attached thereto.

16. The machine of claim 8 wherein:

the cutting blade rotates in a blade chamber;

a suction fan rotates in a fan chamber above the blade chamber; and a restriction opening is between the blade chamber and the fan chamber.

17. The machine of claim 16 wherein:

the blade rotates about an axis of rotation; and the restriction opening substantially defines a circle coincident with the axis of rotation.

18. The machine of claim 8 including an engine driving the fan and the blade and wherein:

the machine includes a clutch and brake assembly spaced from the engine and in operative relationship to the blade, whereby rotation of the blade may be stopped without stopping rotation of the engine.

19. The machine of claim 18 wherein:

the engine drives the blade through a drive shaft; and the clutch and brake assembly is mounted in driven relationship to the drive shaft.

20. In a yard-care machine having a rotating cutting blade for removing the top portions of blades of grass, the improvement comprising:

at least one rotating mulching blade spaced from the cutting blade and comminuting-the top portions into finely divided grass particles, and wherein:

the cutting blade rotates in a first chamber having a first dimension;

the mulching blade rotates in a second chamber having a second dimension less than the first dimension;

a shroud is spaced above the mulching blade and has an exhaust port therein; and a diffuser is positioned at the exhaust port, whereby top portions are converted to lawn-enriching mulch and diffused across the surface of a lawn.

21. The machine of claim 20 including:

a set of wheels;

an engine having a shaft for driving the cutting blade and the mulching blade; and a power transfer device for transferring power from the shaft to the wheels, whereby the machine is self-propelled.

22. In a yard-care machine having a rotating cutting blade for removing the top portions of blades of grass, the improvement comprising:

at least one rotating mulching blade spaced from the blade and comminuting the top portions into finely divided grass particles, and wherein:

a shroud is spaced above the mulching blade;

a chipping plate is interposed between the shroud and the mulching blade; and the shroud includes an opening for introducing branches into contact with the chipping plate.

23. The machine of claim 22 including a fan adjacent to the chipping plate and wherein:

the shroud includes an exhaust port for discharging the chips into a receptacle.

24. In a yard-care machine having a shroud and a cutting blade rotating in the shroud about an axis of rotation for removing the top portions of blades of grass, the improvement wherein:

the shroud includes an upper chamber and a lower chamber;

the machine has a restricting area between the chambers and generally in registry with the axis of rotation;

at least one rotating mulching blade comminutes the top portions into finely divided grass particles;

a portion of the shroud is spaced above the mulching blade and a chipping plate is interposed between the portion and the mulching blade; and the shroud portion has an opening therethrough for introducing branches into contact with the chipping plate.

25. The machine of claim 24 including a fan adjacent to the chipping plate and wherein:

the shroud includes an exhaust port for discharging the chips into a receptacle.

26. The machine of claim 24 having an engine driving the cutting blade for cutting blades of grass and wherein:

the machine includes a clutch-and-brake assembly spaced from the engine and fixed with respect to the cutting blade; and the assembly is between the cutting blade and the mulching blade.

* * * * *

UNITED STATES PATENT AND TRADEMARK OFFICE
CERTIFICATE OF CORRECTION

PATENT NO. : 5,537,807

DATED : July 23, 1996

INVENTOR(S) : Thomas W. Gearing and Andrew W. Haver

It is certified that error appears in the above-identified patent and that said Letters Patent is hereby corrected as shown below:

Column 4, line 50, after "of" delete "10".
Column 8, line 65, after "comminuting" delete "-".

Signed and Sealed this

Twelfth Day of November, 1996

Attest:

BRUCE LEHMAN

Attesting Officer     Commissioner of Patents and Trademarks